US012172182B2

(12) United States Patent
Silberman et al.

(10) Patent No.: US 12,172,182 B2
(45) Date of Patent: Dec. 24, 2024

(54) CAGE FOR A PAINT ROLLER

(71) Applicant: 391395 Ontario Limiited, Concord (CA)

(72) Inventors: Tamir Silberman, Concord (CA); Eitan Silberman, Concord (CA); Henry Silberman, Concord (CA); Tuvia Rondberg, Ramat Hagolan (IL); Haron Hacko, Kfar Kama (IL)

(73) Assignee: 391395 Ontario Limited, Concord (CA)

( * ) Notice: Subject to any disclaimer, the term of this patent is extended or adjusted under 35 U.S.C. 154(b) by 255 days.

(21) Appl. No.: 17/566,286

(22) Filed: Dec. 30, 2021

(65) Prior Publication Data

US 2023/0211372 A1 Jul. 6, 2023

(51) Int. Cl.
*B05C 17/02* (2006.01)

(52) U.S. Cl.
CPC ................................ *B05C 17/0217* (2013.01)

(58) Field of Classification Search
CPC .................................................. B05C 17/0217
See application file for complete search history.

(56) References Cited

U.S. PATENT DOCUMENTS

| | | | | |
|---|---|---|---|---|
| 2,747,211 | A | 5/1956 | Touchett | |
| 4,476,806 | A * | 10/1984 | Lubniewski | B05C 17/0217 118/414 |
| 5,210,899 | A | 5/1993 | Goldstein et al. | |
| 5,345,648 | A | 9/1994 | Graves | |
| 6,510,579 | B1 | 1/2003 | Gartner | |
| 8,910,339 | B1 * | 12/2014 | DeLeon | B05C 17/0217 492/19 |
| 9,573,161 | B2 | 2/2017 | Goodwin, Jr. et al. | |
| 2002/0187888 | A1 * | 12/2002 | Newman | B05C 17/0217 492/19 |
| 2006/0278751 | A1 | 12/2006 | Chen | |
| 2007/0143946 | A1 * | 6/2007 | Kim | B05C 17/023 492/19 |
| 2012/0129668 | A1 | 5/2012 | Buckel, Jr. et al. | |
| 2012/0210533 | A1 * | 8/2012 | Thal | B05C 17/0217 15/230.11 |
| 2013/0340192 | A1 * | 12/2013 | DeCarr | B05C 17/0227 15/230.11 |

(Continued)

FOREIGN PATENT DOCUMENTS

| | | | |
|---|---|---|---|
| CN | 107366416 | A | 11/2017 |
| FR | 2832081 | A1 | 5/2003 |

OTHER PUBLICATIONS

Nour: Rollers; https://www.nour.com/rollers; Oct. 22, 2021.

*Primary Examiner* — J C Jacyna
(74) *Attorney, Agent, or Firm* — Lathrop GPM LLP

(57) ABSTRACT

A device including a roller cage configured for connection to a frame of a paint roller. The roller cage includes a distal end cap having an outer wall. The roller cage also includes a roller cage body connected to the distal end cap, the roller cage body including a first side wall and a second side wall opposed to the first side wall. The first side wall and the second side wall radially extend less than a radius of the distal end cap. The roller cage also includes a crest disposed at least partially within the roller cage body and extending radially past the first side wall and the second side wall.

10 Claims, 13 Drawing Sheets

SECTION A-A

(56) References Cited

U.S. PATENT DOCUMENTS

| | | | | |
|---|---|---|---|---|
| 2016/0001318 | A1* | 1/2016 | Nespoli | B05C 17/02<br>15/230.11 |
| 2016/0136679 | A1* | 5/2016 | Mitchell | B05C 17/0217<br>427/428.01 |
| 2018/0207676 | A1* | 7/2018 | Burns | B05C 17/0212 |
| 2018/0272380 | A1 | 9/2018 | Apelstedt et al. | |

* cited by examiner

CAGE FOR A PAINT ROLLER

BACKGROUND

Paint rollers are useful tools during painting projects, such as painting the walls of a building. Paint rollers have a handle for gripping the paint roller, a roller cage for holding a roller cover used to apply paint, and possibly other components. The roller cover may be changed frequently.

SUMMARY

The one or more embodiments provide for a device including a roller cage configured for connection to a frame of a paint roller assembly. The roller cage includes a first open triangular section joined to a second open triangular section by a side brace. The first open triangular section and the second open triangular section includes an open triangular shape along a radial cross-section of the roller cage.

The one or more embodiments also provide for a device including a roller cage configured for connection to a frame of a paint roller. The roller cage includes a distal end cap having an outer wall. The roller cage also includes a roller cage body connected to the distal end cap, the roller cage body including a first side wall and a second side wall opposed to the first side wall. The first side wall and the second side wall radially extend less than a radius of the distal end cap. The roller cage also includes a crest disposed at least partially within the roller cage body and extending radially past the first side wall and the second side wall.

The one or more embodiments also provide for a method. The method includes manufacturing a roller cage configured for connection to a frame of a paint roller assembly. The roller cage includes a first open triangular section joined to a second open triangular section by a side brace. The first open triangular section and the second open triangular section includes an open triangular shape along a radial cross-section of the roller cage.

Other aspects of the one or more embodiments will be apparent from the following description and the appended claims.

DETAILED DESCRIPTION

Figure 1A:
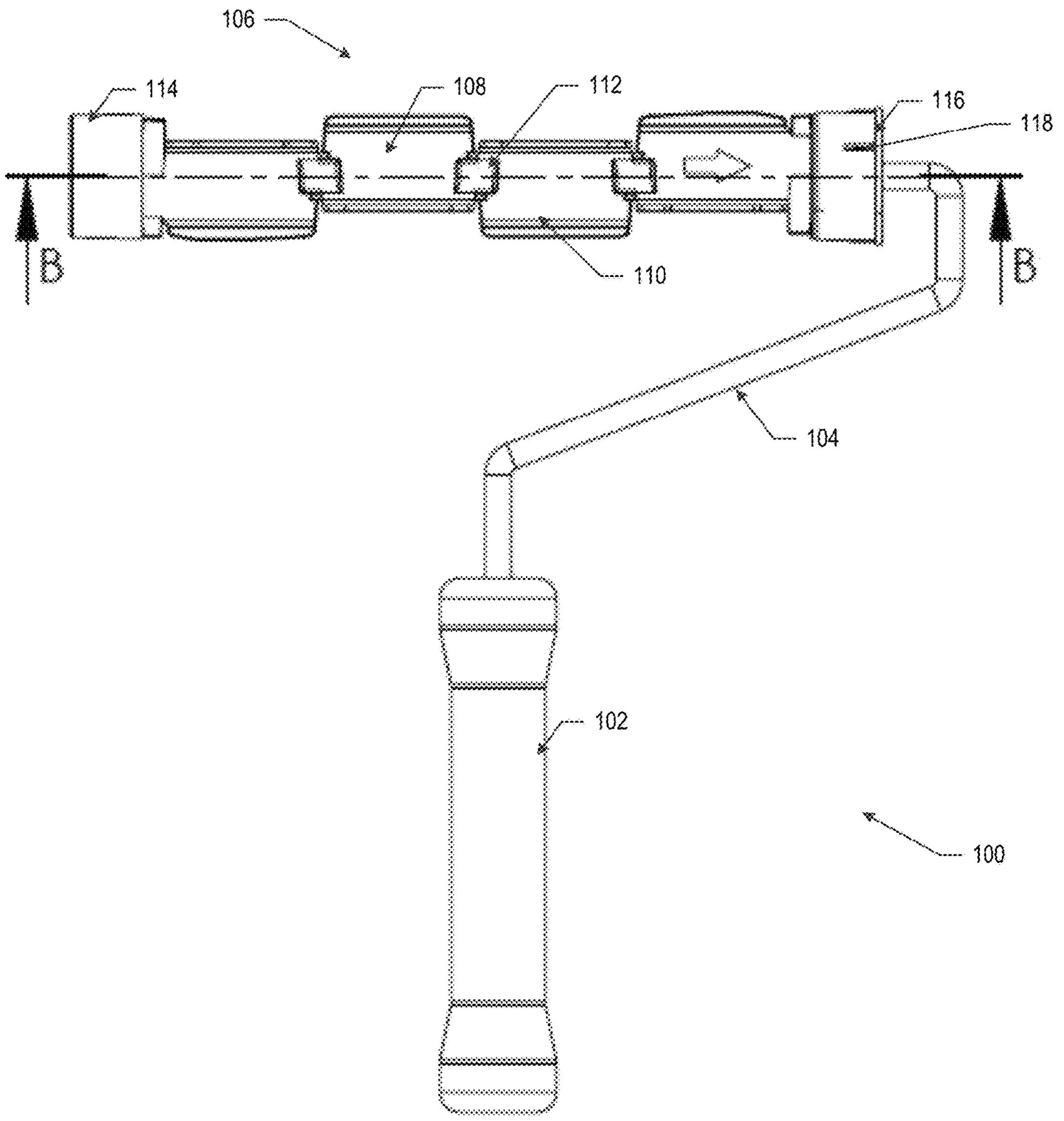
FIG. 1A, FIG. 1B, FIG. 1C, FIG. 1D, FIG. 1E, and FIG. 1F, show a paint roller, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

In general, the one or more embodiments relate to an improved paint roller. In particular, the one or more embodiments relate to an improved roller cage that retains a roller cover during use, but which allows for easier exchange of roller covers. The roller cage of the one or more embodiments includes two or more connected open triangle sections with flared flanges, where the apex of an open triangle section is aligned with a bottom of an adjacent open triangle section. The open triangle sections may be flexible enough for a user to grip a part of the roller cage, thereby compressing the open triangle selections and increasing the ease with which the user can slip a roller cover off the roller cage. One end cap may allow the roller cover to slide off, and the opposed end cap may include additional flanges to establish a pressure fit between the roller cover and the opposed end cap during use.

The roller cage of the one or more embodiments may have a variety of different sizes and dimensions to cover differently sized and/or shaped roller covers. For example, the one or more embodiments may be 3 inch, 4 inch, 7 inch, 9 inch, 9.5 inch, and 14 inch frames that accommodate the correspondingly sized roller covers. The one or more embodiments may operate with a variety of wire gauges, such as but not limited to 6 millimeter and 8 millimeter wire gauges.

Attention is now turned to the figures. FIG. 1A, FIG. 1B, FIG. 1C, FIG. 1D, FIG. 1E, and FIG. 1F show a paint roller, in accordance with one or more embodiments. FIG. 1A through FIG. 1F use common reference numerals to refer to common objects having common descriptions. FIG. 1A through FIG. 1F should be considered together.

Turning first to FIG. 1A, paint roller (100) includes a handle (102) connected to a frame (104). A roller cage (106) is connected to the frame (104). A roller cover (see FIG. 2A) may be disposed over the roller cage (106).

The frame (104) may be one or more metal bars or rods bent into the shape shown in FIG. 1A. The frame (104) may be shaped like a question mark, as shown in FIG. 1A, but may have a variety of different shapes. In an embodiment, the frame (104) is shaped so that when a roller cover is disposed on the roller cage (106), a center of the roller cover aligns at least approximately with a longitudinal axis of the handle (102). The longitudinal axis corresponds to the line that indicates section "B-B".

The roller cage (106) is two or more connected open triangle sections with flared flanges, where the apex of an open triangle section is aligned with a bottom of an adjacent open triangle section. The embodiment shown in FIG. 1A shows four open triangle sections, all connected to each other. Each open triangle section includes opposed flared flanges on the bottoms of the sides of the triangles, as well as a flange extending from the apexes of the triangles. The triangles are described as "open" triangles, as the bases of the triangles are open (i.e. do not have any material between the bottoms of the sides). Further details of the open triangle sections is provided with respect to FIG. 1C through FIG.

The open triangle sections are connected via pairs of side braces, such as side brace (112). The side braces are blocks of the same material that form the open triangle sections, and may be integrally formed with the open triangle sections. Thus, in an embodiment, all four open triangle sections may be formed from a mold or by three-dimensional printing. In other embodiments, the side brace (112) may be bolted, screwed, welded, or otherwise secured in place to serve as a connection between each open triangle section (also referred—to as a locking section) without interfering with the flexibility of the roller cage (106).

The roller cage (106) also includes two end caps, distal end cap (114) and proximal end cap (116). The term "distal" refers to a portion of the roller cage (106) that is farther from the point where the frame (104) initially meets the roller cage (106). The term "proximal" refers to a portion of the roller cage (106) that is closer to the point where the frame (104) initially meats the roller cage (106).

Figure 2A:
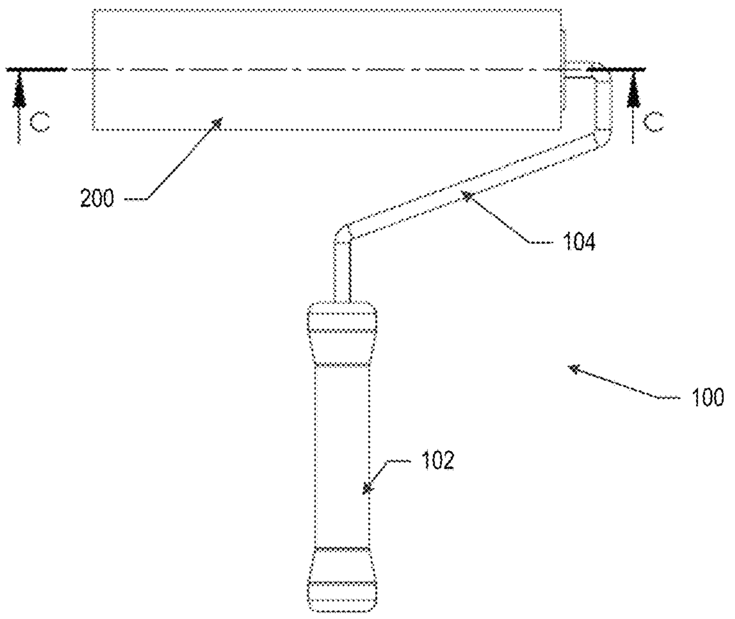
FIG. 2A, FIG. 2B, FIG. 2C, and FIG. 2D show a paint roller holding a roller cover, in accordance with one or more embodiments.
Figure 2B:
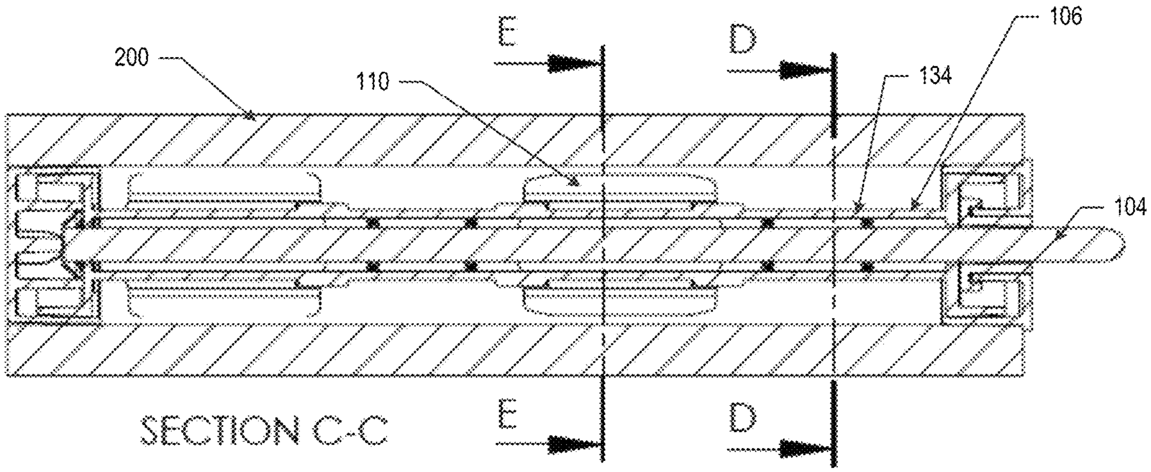

The distal end cap (114) may be smooth and have a diameter sized and dimensioned to be about the same as, or somewhat smaller than, a diameter of a tube disposed through a roller cover (see FIG. 2B). The distal end cap (114) also has a diameter that is about the same as, or somewhat smaller than, a distance as measured between the apex of one open triangle section and the apex of an adjacent triangle section (e.g., the distance that separates the apex of the first open triangle section (108) and the apex of the second open triangle section (110) along a radial axis that is perpendicular to the longitudinal axis of the roller cage (106)).

The proximal end cap (116) may have a diameter sized and dimensioned to be about the same as, or somewhat smaller than, the diameter of the tube disposed through a roller cover. However, the proximal end cap (116) may also be provided with one or more radially extending flares, such as flare (118).

In use, a painter desires to apply paint using a roller cover and the paint roller (100). The painter slides the roller cover over the roller cage (106). The open triangle sections may bend as the roller cover slides on, thereby applying a retaining pressure to the roller cover (i.e. the roller cover has a tension fit relationship with the roller cage (106)). The roller cover may then be slid over the proximal end cap (116). The flare (118) and other flares on the proximal end cap (116) may provide for a stronger tension fit between the roller cover and the roller cage (106).

Figure 1B:
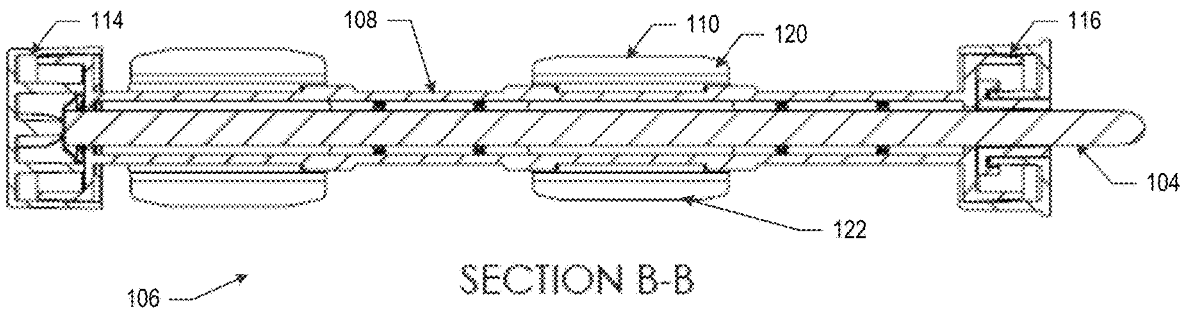

FIG. 1B shows a cross-section of the roller cage (106) along section B-B in FIG. 1A. Thus, a different view is provided of the frame (104), first open triangle section (108), second open triangle section (110), distal end cap (114), and proximal end cap (116). As can be seen in FIG. 1B, the frame (104) may extend through the proximal end cap (116), through the open triangle sections, and into the distal end cap (114). In use, the open triangle sections of the roller cage (106) may freely rotate around the frame (104).

FIG. 1B also shows two sets of the opposed flared flanges on non-adjacent open triangle sections. For example, the second open triangle section (110) includes a first flared flange (120) and a second flared flange (122). The flared flanges are located on the bottom of the second open triangle section (110). Because the adjacent open triangle sections have opposing apexes, section B-B in FIG. 1B only show the opposed flares on two of the four open triangle sections.

Figure 1C:
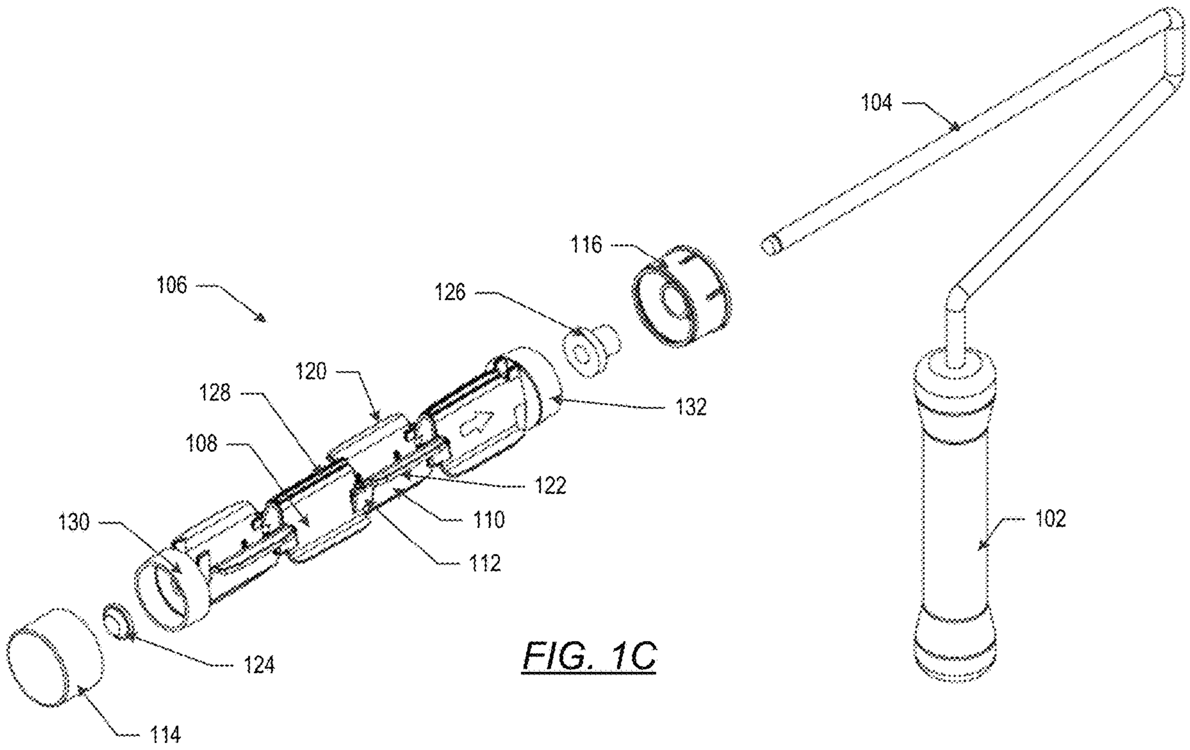

Attention is turned to FIG. 1C, which shows an exploded view of the roller cage (106), in the context of the handle (102) and the frame (104). As can be seen in FIG. 1C, the frame (104) is disposed through the proximal end cap (116), the second open triangle section (110), the first open triangle section (108), and the distal end cap (114), as well as the other two open triangle sections. The side braces (e.g., side brace (112)) on one side of the roller cage (106) are also shown.

In an embodiment, the frame (104) does not contact any of the open triangle sections, but rather is disposed through the spaces inside the open triangle sections. The frame (104) connects directly to the roller cage (106) via a distal stop (124) that connects the roller cage (106) to the distal end cap (114). The frame (104) also connects directly to the roller cage (106) via a proximal roller bearing (126) that connects the roller cage (106) to the proximal end cap (116).

FIG. 1C also provides a perspective of the open triangle sections. For example, the first flared flange (120) and the second flared flange (122) of the second open triangle section (110) are clearly visible, as is the fact that there is no material along the plane that would form the base of the second open triangle section (110). Thus, when the second open triangle section (110) undergoes a compressive radial force, the second open triangle section (110) squeezes so that the radial distance between the first flared flange (120) and the second flared flange (122) decreases. However, when released, the first flared flange (120) and the second flared flange (122) will apply an outwardly directed radial force against the inside tube of a roller cover.

FIG. 1C also shows the flanges on the apexes of the open triangle sections. For example, for first open triangle section (108), the apex includes apex flange (128). The shape and radial width of the apex flange (128) is designed to stabilize and correctly position the flared flanges of the open triangle sections, thus improving the tension fit of the roller cover on the roller cage (106).

FIG. 1C also shows roller fittings, such as the distal roller fitting (130) and the proximal roller fitting (132). The roller fittings allow the corresponding end caps to be connected to the roller cage (106). Thus, for example, the distal roller fitting (130) connects the roller cage (106) to the distal end cap (114), with the distal stop (124) connected to the distal end cap (114) and the distal roller fitting (130). Likewise, the proximal roller fitting (132) connects the roller cage (106) to the proximal end cap (116), with the proximal roller bearing (126) connected to the proximal end cap (116) and the proximal roller fitting (132).

In use, the frame (104) is inserted through the proximal end cap (116), proximal roller bearing (126), proximal roller fitting (132), the open triangle sections, the distal roller fitting (130), the distal stop (124), and the distal end cap (114). A distal end of the frame (104) may be disposed against or near an internal component of the distal end cap (114) (see, for example, the inner protrusion (402) in FIG. 4A). While the roller cage (106) does not have parts that move relative to each other, open triangle sections of the roller cage (106) are free to rotate around the frame (104). In this manner, the painter may roll a roller cover against a workpiece (e.g., a wall being painted) when the roller cover is disposed on the roller cage (106).

The frame (104) is held in place along a longitudinal axis of the roller cage (106) by means of the distal stop (124), which forms a tension fit with the distal end of the frame (104). While so held, the distal roller fitting (130) rotates inside the distal end cap (114) so that a roller cover disposed over the open triangle sections may rotate with the remainder of the roller cage (106).

Figure 1D:
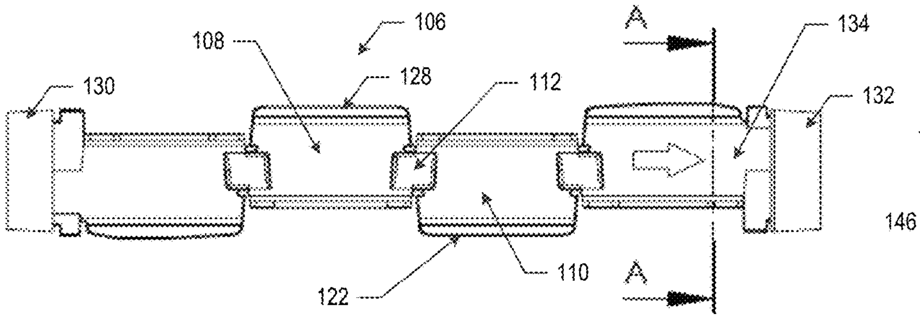

Attention is now turned to FIG. 1D, which shows another perspective of the roller cage (106). The first open triangle section (108), second open triangle section (110), side brace (112), second flared flange (122), apex flange (128), distal roller fitting (130), and proximal roller fitting (132) are shown for reference.

Additionally, a section A-A is drawn through FIG. 1D through a proximal open triangle section (134). Section A-A lies along a radial axis of the roller cage (106).

Figure 1E:
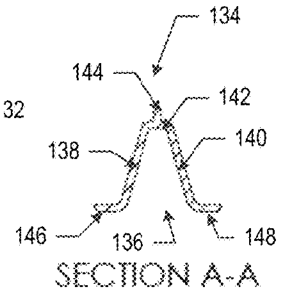

FIG. 1E shows the cross-section of the roller cage (106) as drawn along section A-A in FIG. 1D. As can be seen, the proximal open triangle section (134) has an approximately open triangular shape. Again, the term "open" means that the base of the triangular shape (as indicated generally at arrow (136)) does not have material, such that a gap (again defined generally at arrow (136)) is defined between the bottom of the two side walls (i.e., the first side wall (138) and the second side wall (140) of the proximal open triangle section (134)).

The proximal open triangle section (134) also includes an apex (142). The apex (142) need not be pointed, but may be flat as shown. Thus, the apex (142) of the proximal open triangle section (134) may form a "hat" shape, as indicated in FIG. 1E, though other shapes may be used. A apex flange (144) extends radially upwardly from the apex (142).

Additionally, as indicated above in FIG. 1D for the second open triangle section (110), two opposed flared flanges extend from the bottoms of the side walls. Thus, a first flange (146) extends radially from the first side wall (138), and a second flange (148) extends radially from the second side wall (140).

In an embodiment, the proximal open triangle section (134) is formed as a monocoque, or integrally formed, body. However, in other embodiments, one or more of the first side wall (138), second side wall (140), apex (142), apex flange (144), first flange (146), and second flange (148) may be formed as separate pieces and connected to each other.

While FIG. 1E describes the cross-sectional shape of one open triangle section, the description of the proximal open triangle section (134) may have also apply to one or more of the other open triangle sections of the roller cage (106), such as shown in FIG. 1A through FIG. 1D.

Figure 1F:
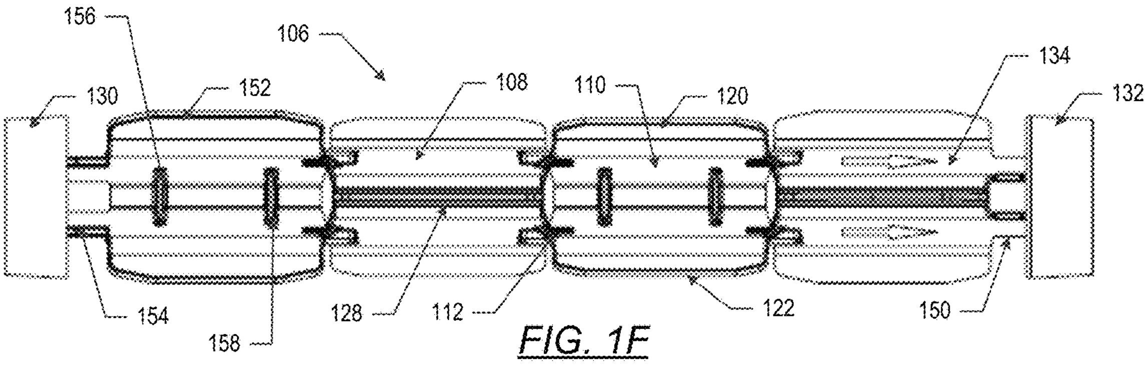

Attention is now turned to FIG. 1F, which shows another view of the roller cage (106). The first open triangle section (108), second open triangle section (110), side brace (112), first flared flange (120), second flared flange (122), apex flange (128), distal roller fitting (130), proximal roller fitting (132), and proximal open triangle section (134) are shown for reference.

FIG. 1F shows several additional features of the roller cage (106), which may be optional or may have different shapes or structures in other embodiments. For example, the roller cage (106) includes one or more extension inserts that extend from the terminal open triangle sections. For example, the proximal open triangle section (134) may have a proximal extension insert (150). The proximal extension insert (150) extends about parallel to a longitudinal axis of the roller cage (106) (see FIG. 1A). The proximal extension insert (150) connects the proximal open triangle section (134) to the proximal roller fitting (132). Similarly, a distal open triangle section (152) may have a distal extension insert (154) that extends about parallel to a longitudinal axis of the roller cage (106). The distal extension insert (154) connects the distal open triangle section (152) to the distal roller fitting (130).

FIG. 1F also shows that the open triangle sections may be formed with retaining rings through which the frame (104) (see FIG. 1C) may be disposed. For example, the distal open triangle section (152) shows a first retaining ring (156) and a second retaining ring (158). The other open triangle sections may include similar retaining rings. In use, the frame (104) is disposed through the retaining rings in order to better retain the roller cage (106) onto the frame (104).

The additional features in FIG. 1F may be varied. For example, the retaining rings may be replaced with hemispherical bearings against which the roller cage (106) may roll around the frame (104). The extension inserts may be replaced with other structures, such as a snap cap or some other structure that connect the open triangle sections to the roller fittings.

Other variations are possible. Thus, the examples shown in FIG. 1A through FIG. 1F do not necessarily limit the other embodiments described herein.

FIG. 2A, FIG. 2B, FIG. 2C, and FIG. 2D show a paint roller holding a roller cover, in accordance with one or more embodiments. Again, the roller cover is the portion of the paint roller that applies paint to a surface. Because roller covers may be changed often, the roller cover (200) is removably connected to roller.

However, the structure of the roller cage (106) has not changed in FIG. 2A through FIG. 2D. Thus, reference numerals used in FIG. 2A through FIG. 2D that are common to FIG. 1A through FIG. 1F refer to the objects and descriptions provided above with respect to FIG. 1A through FIG. 1F.

For example, FIG. 2A shows the handle (102) and the frame (104) of the paint roller (100), with the roller cover (200) disposed over the roller cage (see roller cage (106) in FIG. 1A). The descriptions for the handle (102) and the frame (104) are provided above with respect to FIG. 1A through FIG. 1F. FIG. 2A also shows cross-section C-C along the longitudinal axis of the roller cover (200).

FIG. 2B shows the details of cross-section C-C in FIG. 2A. Thus, for example, the roller cover (200) can be seen disposed around the roller cage (106). In turn, the frame (104) is disposed through the roller cage (106). The second open triangle section (110) and the proximal open triangle section (134) of the roller cage (106) are also shown for reference.

In use, paint is applied to the roller cover (200). The roller cover (200) is then brought against the workpiece (e.g., a wall to be painted, an object to be painted, etc.). As the user moves the paint roller (100) up and down over the workpiece, the roller cover (200) and the roller cage (106) roll around the frame (104), thereby distributing the surface of the roller cover (200) over the workpiece.

Figure 2C:
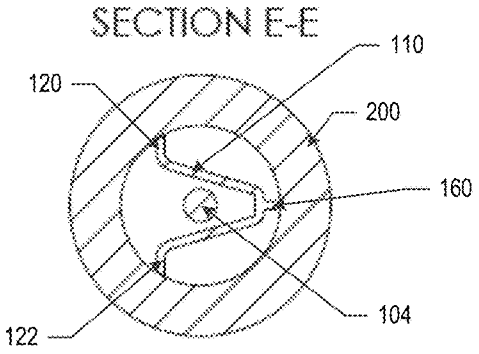

FIG. 2C shows the details of radial cross-section E-E in FIG. 2B. As can be seen, the second open triangle section (110) is disposed inside the inner tube of the roller cover (200). The frame (104) is disposed inside the second open triangle section (110) and, in the embodiment shown, is not connected to the side walls of the second open triangle section (110) at the location of cross-section E-E.

The flanges of the second open triangle section (110) press against the inner walls of the inner tube of the roller cover (200). In particular, the first flared flange (120), second flared flange (122), and a second apex (160) provide a tension fit connection between the roller cover (200) and the second open triangle section (110). However, because the second open triangle section (110) is flexible under the grip strength of an ordinary person, the force of the tension fit can easily be overcome, and the roller cover (200) slid along the second open triangle section (110) (as part of removing the roller cover (200) from the roller cage (106)).

Figure 2D:
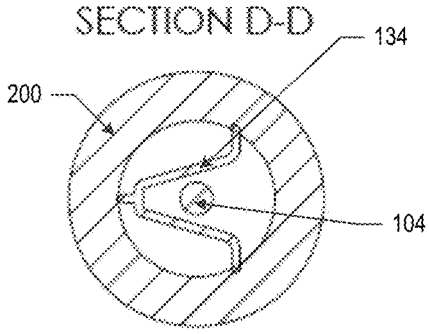

Returning to FIG. 2B, section D-D is also shown at a longitudinal location along the longitudinal axis of the roller cage (106) that is closer to a proximal side of the roller cage (106), relative to section E-E. FIG. 2D shows the details of section D-D.

Again, referring to FIG. 2D, section D-D is drawn through the proximal open triangle section (134). The proximal open triangle section (134) has the same structure and flange arrangement as the second open triangle section (110) also shown along section E-E in FIG. 2C. However, as shown in FIG. 2D, the proximal open triangle section (134) is oriented one hundred and eighty degrees around the longitudinal axis of the frame (104), relative to the second open triangle section (110) shown in FIG. 2C. The orientation of the two open triangular sections may be described as 'inverted.' Thus, when viewed together as a whole, FIG. 2B, FIG. 2C, and FIG. 2D show the arrangement of opposed or inverted apexes and bases of two of the open triangle sections. The arrangement is also visible in FIG. 1C.

Figure 3A:
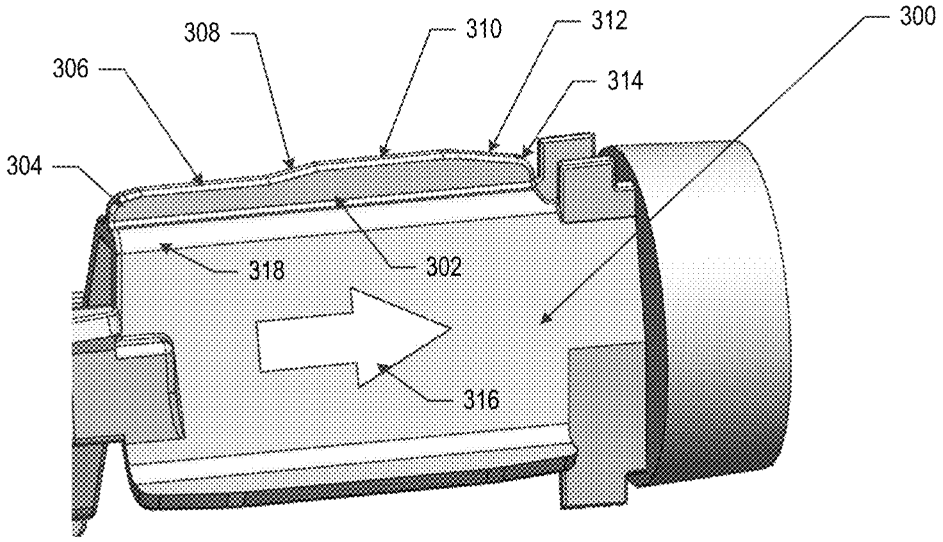
FIG. 3A, FIG. 3B, FIG. 3C, and FIG. 3D show variations of a paint roller cage, in accordance with one or more embodiments.
Figure 3B:
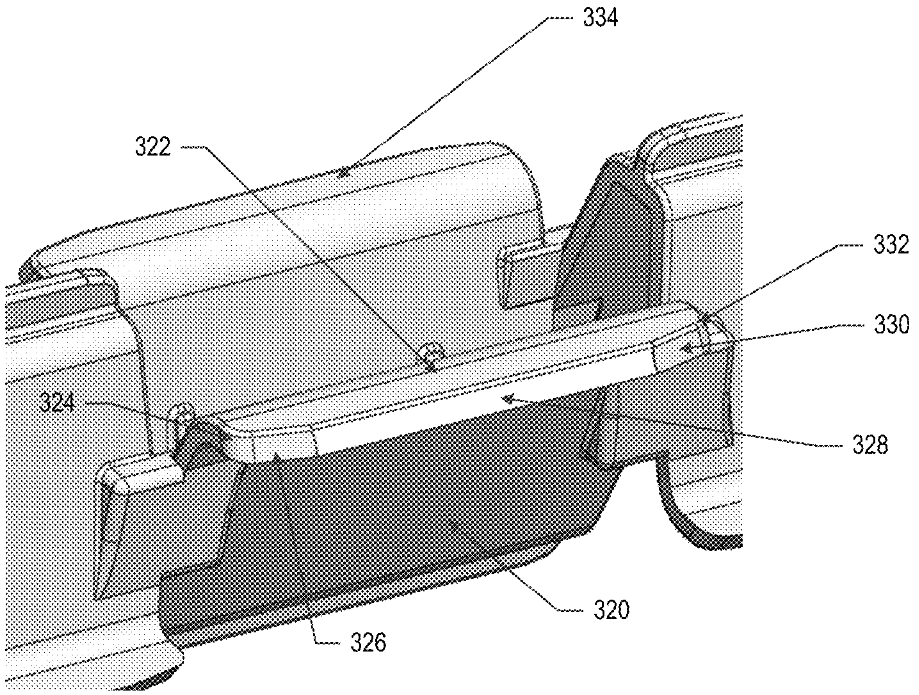

Attention is now turned to FIG. 3A, FIG. 3B, FIG. 3C, and FIG. 3D, which show variations of a paint roller cage, in accordance with one or more embodiments. The underlying structure of the open triangle sections is similar to that described in FIG. 1A through FIG. 2D. However, the open triangle section shown in FIG. 3A through FIG. 3B show variations to the shapes of the various flanges described above.

For example, as shown in FIG. 3A, the open triangle section (300) has an irregularly-shaped apex flange (302) along a longitudinal length of the apex flange (302). The irregular shape is designed to make slipping the roller cover on and off of the open triangle section (300) easier, but to nevertheless provide a snug tension fit with the roller cover during painting.

Specifically, the apex flange (302) may be considered as having multiple sections, described from a distal end of the apex flange (302) to a proximal end of the apex flange (302). The apex flange (302) includes a distal rounded corner (304) that is rounded into a quarter-circular, parabolic, elliptical, or other rounded shape so as to prevent the roller cover from becoming snagged on the distal rounded corner (304) as the roller cover is slipped on in direction indicated by arrow (316).

A first section (306) is adjacent the distal rounded corner (304). The first section (306) may have a radial height above an apex (318) that does not vary along the longitudinal length of the first section (306), or that slopes slightly upwardly in the proximal direction. The first section (306) helps the roller cover to find purchase on the apex flange (302).

A second section (308) is adjacent the first section (306). The second section (308) slopes upwardly in radial height in a proximal longitudinal direction along the apex flange (302). The upward slope helps prevent catching of the roller cover as the roller cover is slid in the direction of the arrow (316).

A third section (310) is adjacent the second section (308). The third section (310) has a level radial cross section in a proximal longitudinal direction along the apex flange (302). The third section (310) represents a maximum radial height of the apex flange (302), and thus will provide the maximum tension fit between the roller cover and the open triangle section (300).

A fourth section (312) is adjacent the third section (310). The fourth section (312) has a radial cross section that slopes downwardly in a proximal longitudinal direction along the apex flange (302). The fourth section (312) helps the roller cover from catching on a part of the apex flange (302) when the roller cover is slid off of the open triangle section (300) in a direction opposite to that shown by the arrow (316).

A proximal rounded corner (314) is adjacent the fourth section (312). The proximal rounded corner (314) is rounded, possibly in a manner similar to the distal rounded corner (304), so as to prevent the roller cover from catching on the apex flange (302) when the roller cover is slipped off of the open triangle section (300) in a direction opposite to that shown by the arrow (316).

Attention is now turned to FIG. 3B, which shows an open triangle section (320), which may be similar to the open triangle section (300) shown in FIG. 3A. The embodiment shown in FIG. 3B shows details of a flared flange (322) of the open triangle section (320). The opposed flared flange (334) is shown for reference, and may have a similar structure as the flared flange (322).

The shape of the flared flange (322) is described from a distal direction to a proximal direction. Thus, the flared flange (322) begins with a distal flange corner (324) that is rounded, as described with respect to the distal rounded corner (304) in FIG. 3A.

Adjacent the distal flange corner (324) is a fifth section (326), which slopes outwardly in radial cross section long the longitudinal length of the flared flange (322), relative to a distal to proximal direction. Together, the distal flange corner (324) and the fifth section (326) help prevent the roller cover from catching on the flared flange (322) as the roller cover is slid onto the open triangle section (320) from the distal direction towards the proximal direction.

Adjacent the fifth section (326) is a sixth section (328). The sixth section (328) may have a roughly uniform radial cross section along the longitudinal length of the flared flange (322), and represents a maximum radial extent of the flared flange (322). Thus, the sixth section (328) forms a tension fit between the inner walls of the roller cover and the open triangle section (320).

A seventh section (330) is adjacent the sixth section (328). The seventh section (330) may slope inwardly in radial cross section along the longitudinal length of the flared flange (322), relative to a distal to proximal direction.

A proximal flange corner (332) is adjacent the seventh section (330). The proximal flange corner (332) is also rounded, as described with respect to the distal rounded corner (304) in FIG. 3A. Together, the proximal flange corner (332) and the seventh section (330) help prevent the roller cover from catching on the flared flange (322), as the roller cover is slid off of the open triangle section (320) from the proximal direction towards the distal direction.

Figure 3C:
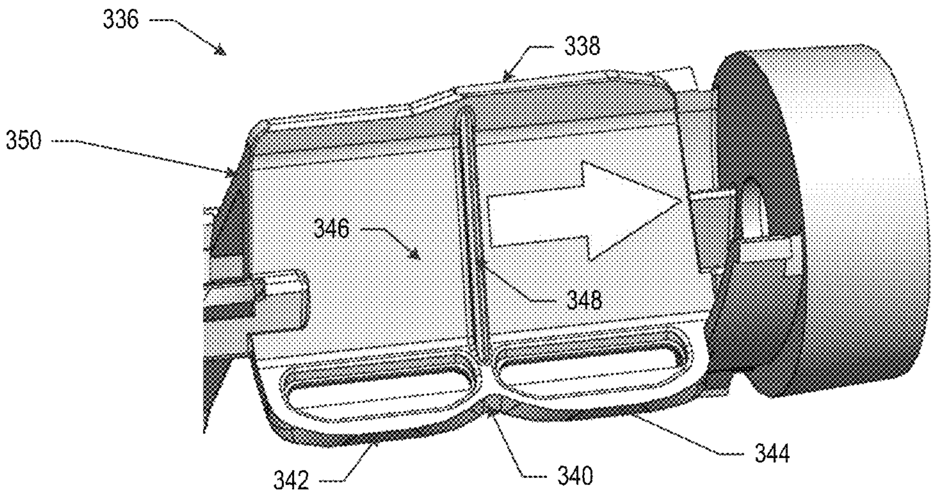

FIG. 3C shows another open triangle section, namely open triangle section (336). The open triangle section (336) has an apex flange (338) having a similar shape as the apex flange (302) of FIG. 3A. However, the flared flanges at the bottom of the open triangle section (336) have a different shape.

Specifically, the flared flange (340) includes a first handle (342) and a second handle (344) that extend radially outwardly from a bottom of the sidewall (346) of the open triangle section (336). The handles each have rounded corners and flat sections, such as for example described with respect to the flared flange (322) in FIG. 3B.

Additionally, a reinforcing chord (348) extends radially outwardly from the sidewall (346), and connects the flared flange (340) to the apex flange (338). The reinforcing chord (348) provides additional structural strength to the reinforcing chord (348).

Finally, the apex (350) of the open triangle section (336) has a triangular shape in cross section, rather than the hat shaped cross section shown for the proximal open triangle section (134) in FIG. 1E. Thus, FIG. 3C also shows that various aspects of the open triangle section (336) may be varied, in addition to the flared flanges.

Figure 3D:
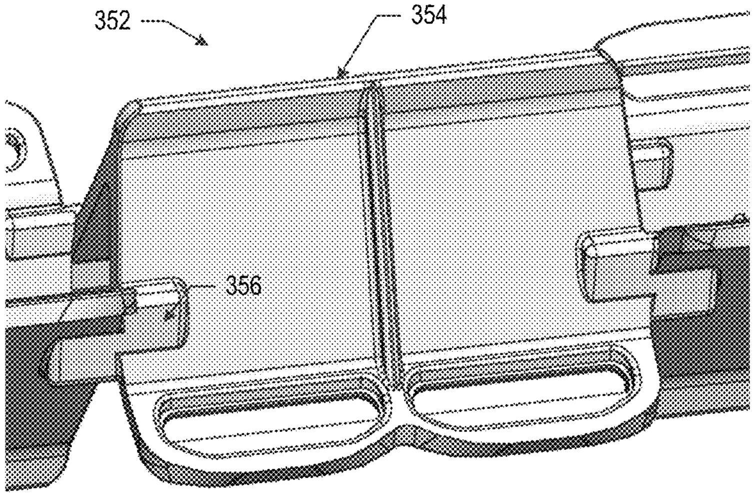

FIG. 3D is similar to FIG. 3C. However, the open triangle section (352) of FIG. 3D has an apex flange (354) that only includes two rounded corners and a long flat section, rather than the irregular shape shown for the apex flange (338) in FIG. 3C.

Additionally, FIG. 3D shows that the side braces may be varied in shape or structure. As shown in FIG. 1D, the side braces may have a rectangular shape or a parallelogram shape. However, FIG. 3D shows that the side brace (356) may have a staggered shape that interlock the open triangle sections in a pre-determined orientation, as shown.

Many other variations of the open triangle sections are possible. Thus, the examples described above do not necessarily limit other embodiments described herein.

FIG. 4A, FIG. 4B, FIG. 4C, FIG. 4D, FIG. 4E, FIG. 4F, FIG. 4G, and FIG. 4H show caps used in the paint roller of FIG. 1A through FIG. 1F. FIG. 4A through FIG. 4H use reference numerals common to FIG. 1A through FIG. 1F, and refer to similar objects having descriptions similar to those described with respect to FIG. 1A through FIG. 1F.

Figure 4A:
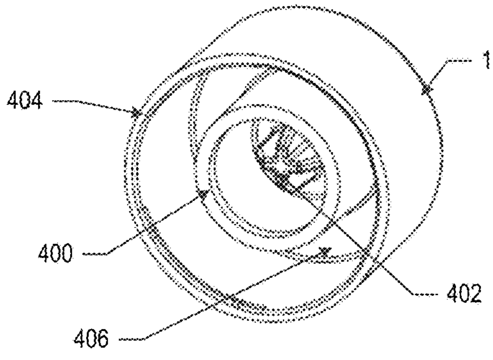
FIG. 4A, FIG. 4B, FIG. 4C, FIG. 4D, FIG. 4E, FIG. 4F, FIG. 4G, and FIG. 4H show caps used in the paint roller of FIG. 1A through FIG. 1F.

FIG. 4A shows a perspective view of the distal end cap (114). The outer surface of the distal end cap (114) is defined by an outer annulus (404) that extends longitudinally from a distal cap wall (406). The distal end cap (114) may include an inner annulus (400) disposed within the distal end cap (114). The inner annulus (400) also extends longitudinally from the distal cap wall (406). The inner annulus (400) connects to the distal stop (124) shown in FIG. 1C and below in FIG. 4E and FIG. 4F.

The distal end cap (114) also includes an inner protrusion (402) having a plus-shaped cross-section along a radial-cross section. The inner protrusion (402) has radial fins that fit into radial slots in the distal stop (124), shown below in FIG. 4E and FIG. 4F. The radial fins establish the plus-shaped cross-section of the inner protrusion (402). The radial fins may be rounded or clipped at the apex of the inner protrusion (402) in order to assist in insertion and/or removal of the distal stop (124) from the inner protrusion (402).

Figure 4B:
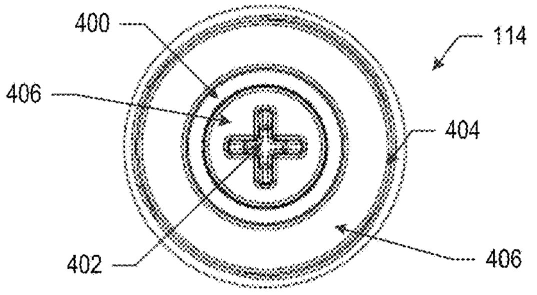

FIG. 4B shows another view of the distal end cap (114). FIG. 4B represents a radial cross section of the distal end cap (114). The inner annulus (400), inner protrusion (402), and outer annulus (404), and distal cap wall (406) are shown for reference.

Figure 4C:
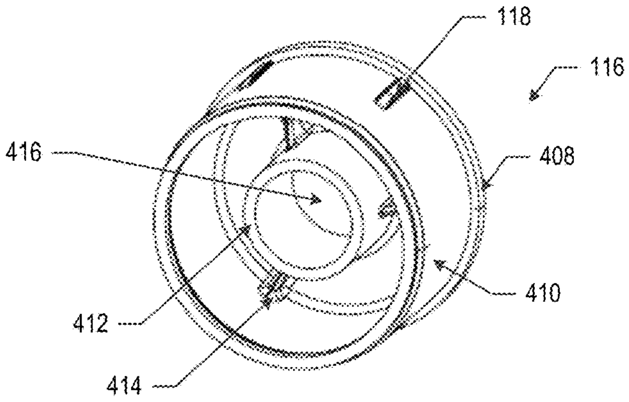

FIG. 4C shows a perspective view of the proximal end cap (116). The proximal end cap (116) includes a proximal cap wall (408). An opening (416) is disposed in a central region of the proximal cap wall (408), in order to accommodate the frame (104) of the paint roller (100).

An outer annulus (410) extends longitudinally from the proximal cap wall (408). A first radius of the proximal cap wall (408) may be larger than a second radius of the outer annulus (410). In this manner, the outer edge of the proximal cap wall (408) serves as a flange or stop when the roller cover is slid onto the outer surface of the outer annulus (410). Additionally, the flare (118) protrudes radially from the outer surface of the flare (118).

The proximal end cap (116) also includes an inner annulus (412) that extends longitudinally from the proximal cap wall (408). The inner annulus (412) receives or fits into the primary annulus of the proximal roller bearing (126) shown in FIG. 1C, and again below in FIG. 4G and FIG. 4H.

The proximal end cap (116) also includes one or more gussets, such as gusset (414). The gusset (414) braces the inner annulus (412) and/or the outer annulus (410) against the proximal cap wall (408).

Figure 4D:
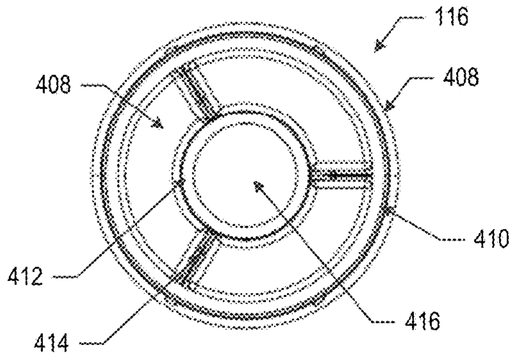

FIG. 4D shows a radial cross-section of the proximal end cap (116). The proximal cap wall (408), outer annulus (410), inner annulus (412), gusset (414), and opening (416) are shown for reference.

Figure 4E:
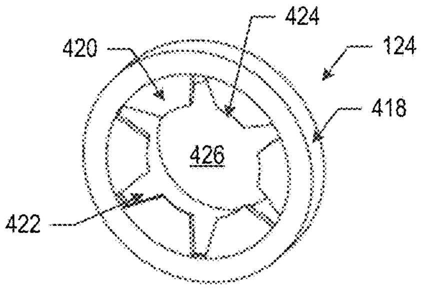

FIG. 4E shows a perspective view of the distal stop (124). The outer diameter of the distal stop (124) is defined by a ring (418). A number of radially inwardly extending tabs, such as tab (420) are connected to the ring (418). The tabs also are angled longitudinally, in addition to extending radially from the ring (418). The longitudinal angling of the tabs is shown in FIG. 4E, and is also visible in FIG. 1C.

A number of radial slots, such as radial slot (422), are disposed between the tabs. The radial slots accommodate the radial fins of the inner protrusion (402). The inner diameter (424) of the distal stop (124) defines an opening (426) in the distal stop (124). In use, the opening (426) accommodates the insertion of the inner protrusion (402) shown in FIG. 4A. The outer diameter of the ring (418) may fit within the inner annulus (400) shown in FIG. 4A.

The ends of the tabs facing the opening (426) together form an inner diameter of the opening (426). The inner diameter of the opening (426) may be sized and dimensioned to form a tension fit with the frame of a paint roller, such as the frame (104) shown in FIG. 1A or FIG. 1C.

Figure 4F:
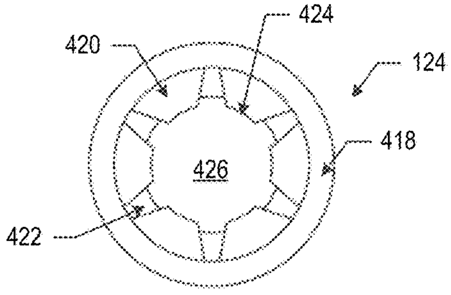

FIG. 4F shows a radial cross-section of the distal stop (124) shown in FIG. 4E. The ring (418), tab (420), radial slot (422), inner diameter (424), and opening (426) are shown for reference.

Figure 4G:
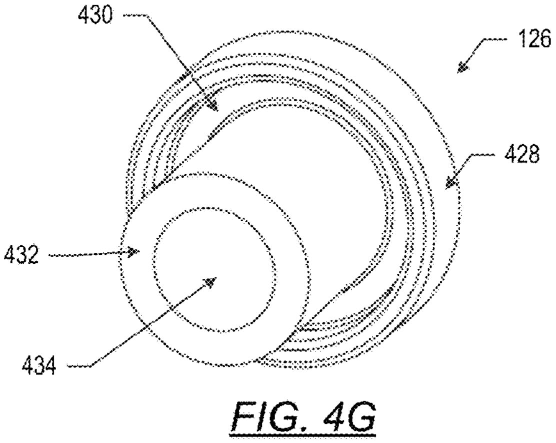

FIG. 4G shows a perspective view of the proximal roller bearing (126). The proximal roller bearing (126) includes an outer annulus (428) that extends longitudinally from a bearing wall (430). A inner annulus (432) also extends longitudinally from the bearing wall (430), though to a greater length than the outer annulus (428) extends from the bearing wall (430). A opening (434) is defined in the inner annulus (432), and extends through to a similar opening in the bearing wall (430).

In use, the inner annulus (432) of the proximal roller bearing (126) is disposed within the opening (416) of the proximal end cap (116) shown in FIGS. 1C and 1*n* FIG. 4C. The outer annulus (428) fits within the outer annulus (410) of the proximal end cap (116), also shown FIG. 1C and FIG. 4C.

Figure 4H:
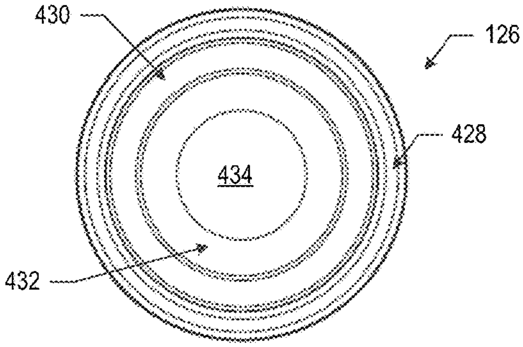

FIG. 4H shows a radial cross-section of the proximal roller bearing (126) shown in FIG. 4G. The outer annulus (428), bearing wall (430), opening (434), and inner annulus (432) are shown for reference.

FIG. 5A, FIG. 5B, FIG. 5C, and FIG. 5D show another variation of a paint roller cage, in accordance with one or more embodiments. FIG. 5A through FIG. 5D should be considered together, so reference numerals common to FIG. 5A through FIG. 5D refer to similar objects having similar descriptions.

Like the roller cage (106) of FIG. 1A, the roller cage (500) of FIG. 5A through FIG. 5D includes a roller cage body (502), a distal end cap (504) connected to a distal end of the roller cage body (502), and a proximal end cap (506) connected to the proximal end of the roller cage body (502). The distal end cap (504) and the proximal end cap (506) may be structured similarly to the distal end cap (114) and the proximal end cap (116) of FIG. 1A through FIG. 1F. For example, the proximal end cap (506) may include radially extending flanges, such as radially extending flange (507), for effecting an additional tension fit between the roller cover and the roller cage (500). As the other components of the distal end cap (504) and the proximal end cap (506) are similar to the distal end cap (114) and the proximal end cap (116) of FIG. 1A through FIG. 1F, the remaining aspects of the distal end cap (504) and the proximal end cap (506) may be described with respect to FIG. 1A through FIG. 1F.

Figure 5A:
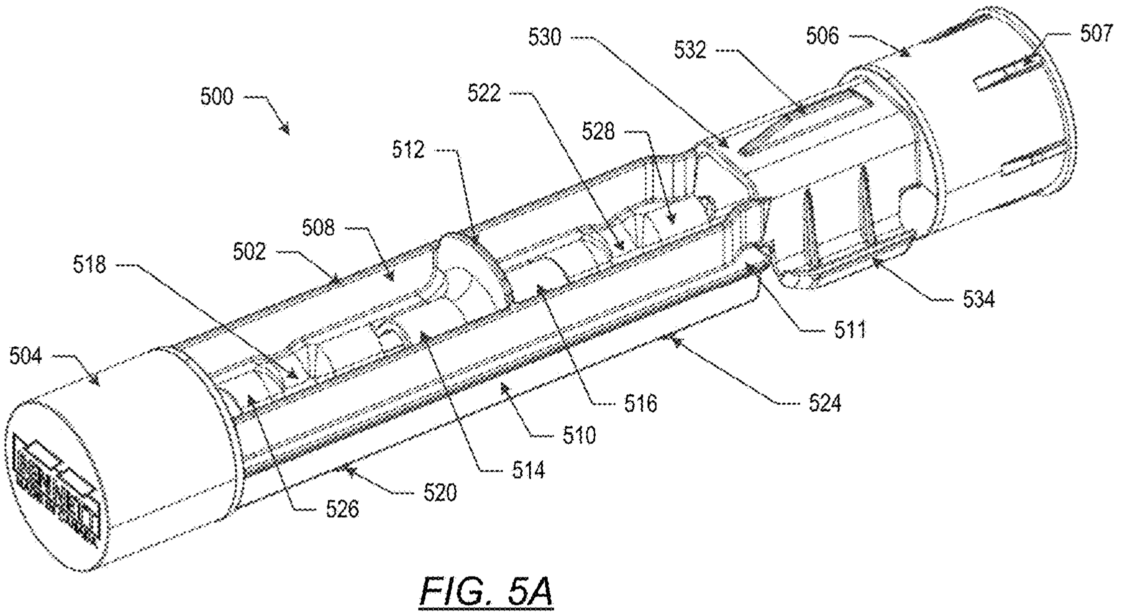
FIG. 5A, FIG. 5B, FIG. 5C, and FIG. 5D show another variation of a paint roller cage, in accordance with one or more embodiments.

In the embodiment of FIG. 5A, the distal end cap (504) has a smooth outer wall. Thus, the roller cover may easily slip over the distal end cap (504) as the roller cover is being slipped on or off.

The roller cage body (502) of FIG. 5A is different than the roller cage (106) of FIG. 1A through FIG. 1F. For example, instead of the alternating open triangle sections of FIG. 1A through FIG. 1F, the roller cage body (502) of the roller cage (500) includes an open housing formed from a first side wall (508) opposed to a second side wall (510).

The side walls may be formed with, or attached to, a reinforcing flange, such as reinforcing flange (511). The reinforcing flange (511) extends radially from the second side wall (510), to about the radius of the distal end cap (504). When a roller cover is disposed on the roller cage (500), the reinforcing flange (511) helps ensure a space between most of the roller cage body (502) and the inner tube of the roller cover. The tension fit between the roller cover and the roller cage body (502) is established by the crests (described below) and the fins and flared flanges (described below). With fewer tension contact points between the roller cover and the roller cage body (502), the reinforcing flange (511) provides structural reinforcement to the roller cover when the roller cover is pressed to a workpiece (e.g., a wall to be painted), but the fewer tension contact points make removing the roller cover easier after use.

While two sides of the roller cage (500) are defined by the first side wall (508) and the second side wall (510), the other two sides (perpendicularly oriented to the first side wall (508) and second side wall (510)) are open. The components described below are disposed between the first side wall (508) and the second side wall (510).

For example, a mid-crest (512) is disposed between and attached to the first side wall (508) and the second side wall (510). The second side wall (510) extends a radial distance at least partially above a radial height of the side walls.

Adjacent the mid-crest (512) are arcuate hemispheres. Specifically, a mid-distal hemisphere (514) is disposed between the first side wall (508) and the second side wall (510), and is connected to a distal side of the mid-crest (512). Similarly, a mid-proximal hemisphere (516) is disposed between the first side wall (508) and the second side wall (510), and is connected to a proximal side of the mid-crest (512). The mid-distal hemisphere (514) and the mid-proximal hemisphere (516) extend to a pre-determined radial distance from a longitudinal axis that defined along a length of the roller cage (500) between the distal end cap (504) and the proximal end cap (506), though the radial extension of the mid-distal hemisphere (514) and the mid-proximal hemisphere (516) is less than a radial height of the first side wall (508) and the second side wall (510). In use, the frame (e.g. frame (104) of FIG. 1A) extends under the two hemispheres.

The roller cage body (502) also includes a distal dimple (518) disposed between the first side wall (508) and the second side wall (510), distally of the mid-distal hemisphere (514). The distal dimple (518) defines a location where a distal crest (520) extends from an opposite side of the roller cage body (502), relative to the mid-crest (512). The distal dimple (518) may extend a pre-determined radial distance from the longitudinal axis of the roller cage body (502). The distal crest (520), like the mid-crest (512), extends past a radial height of the first side wall (508) and the second side wall (510).

Similarly, the roller cage body (502) also includes a proximal dimple (522) disposed between the first side wall (508) and the second side wall (510), proximally of the mid-proximal hemisphere (516). The proximal dimple (522) defines a location where a proximal crest (524) extends from an opposite side of the roller cage body (502), relative to the mid-crest (512). The proximal dimple (522) may extend a pre-determined radial distance from the longitudinal axis of the roller cage body (502). The proximal crest (524), like the mid-crest (512), extends past a radial height of the first side wall (508) and the second side wall (510).

The mid-crest (512), distal crest (520), and proximal crest (524), which also connect to the first side wall (508) and the second side wall (510), strengthen the body of the roller cage body (502). In an embodiment, the radial heights of the mid-crest (512), distal crest (520), and proximal crest (524) relative to the side walls may be smaller than an anticipated inner diameter of a roller cover. In this manner, the crests may not contribute to friction when sliding a roller cover over the roller cage (500). Nevertheless, the crests may serve as a guide while the roller cover is slipped over the roller cage (500).

In an embodiment, the mid-crest (512), distal crest (520), and proximal crest (524) may all extend the same radial height past the first side wall (508) and the second side wall (510). Thus, the mid-crest (512), distal crest (520), and proximal crest (524) together may help support a roller cover in the event a roller cover deforms during a painting operation.

The roller cage body (502) also may include a distal hemisphere (526). The distal hemisphere (526) is disposed between the first side wall (508) and the second side wall (510), and is connected to the distal end cap (504). Similarly, a proximal hemisphere (528) is disposed between the first side wall (508) and the second side wall (510), and is connected to a proximal cap extension (530). (The proximal cap extension (530) is described further below.) The distal hemisphere (526) and the proximal hemisphere (528) extend to a pre-determined radial distance from the longitudinal axis of the roller cage body (502), though the radial extension of the distal hemisphere (526) and the proximal hemisphere (528) is less than a radial height of the first side wall (508) and the second side wall (510). In use, the frame (e.g. frame (104) of FIG. 1A) extends under the two hemispheres.

The mid-distal hemisphere (514) and the mid-proximal hemisphere (516) are oriented one hundred and eighty degrees apart relative to the distal hemisphere (526) and the proximal hemisphere (528). Thus, when the frame (104) of FIG. 1 is disposed through all four hemispheres, the frame (104) is retained within the handle (102).

Attention is now turned to the proximal cap extension (530). The proximal cap extension (530) is optional in some embodiments. The proximal cap extension (530) includes an apex fin (532) that extends radially outwardly from a top of the proximal cap extension (530). The top of the proximal cap extension (530) is about aligned with the radial height of the first side wall (508) and the second side wall (510); thus, the apex fin (532) extends radially a pre-determined distance past the radial height of the first side wall (508) and the second side wall (510).

Similarly, a first flared flange (534) extends from a side-wall of the proximal cap extension (530). A second flared flange (536) (see FIG. 5B) is disposed on an opposing side-wall of the proximal cap extension (530). The first flared flange (534) and the second flared flange (536) extend pre-determined radial distances past the radial extent of the first side wall (508) and the second side wall (510).

Thus, together with the apex fin (532), the first flared flange (534) and the second flared flange (536) form a pressure fit with the inner tube of a roller cover. The pressure fit helps retain the roller cover on the roller cage (500).

The 500 shown in FIG. 5A through FIG. 5D may be varied. For example, referring to FIG. 5A and FIG. 5B, a second cap extension (e.g., a distal cap extension) may be disposed between the distal end cap (504) and the distal end of the roller cage body (502). The second cap extension may be similarly shaped as the proximal cap extension (530) and may have one or more of the features displayed for the proximal cap extension (530) shown in FIG. 5A and FIG. 5B.

Figure 5B:
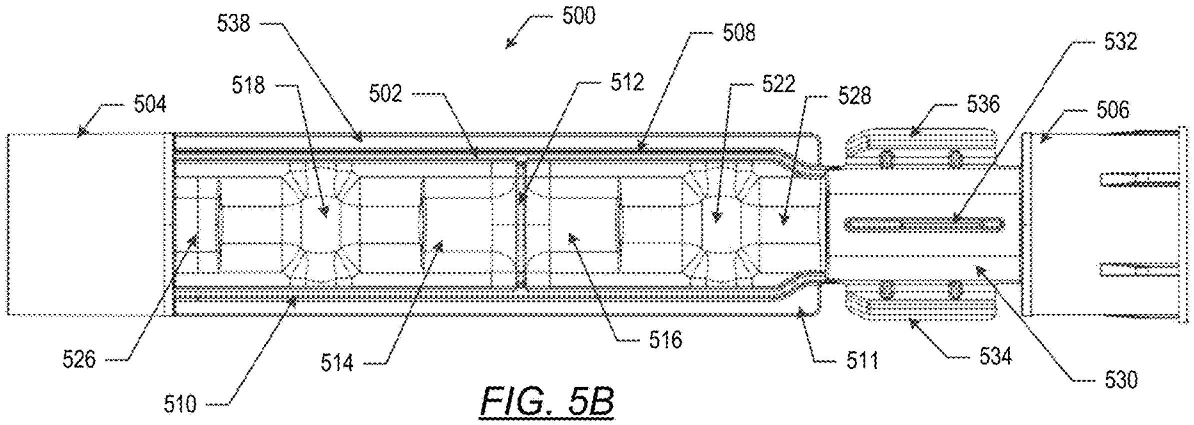

Attention is now turned to FIG. 5B, which shows a top-down view of the roller cage (500) shown in FIG. 5A. The roller cage body (502), distal end cap (504), proximal end cap (506), first side wall (508), second side wall (510), reinforcing flange (511), mid-crest (512), mid-distal hemisphere (514), mid-proximal hemisphere (516), distal dimple (518), proximal dimple (522), distal hemisphere (526), proximal hemisphere (528), proximal cap extension (530), apex fin (532), and first flared flange (534) are shown for reference.

The view of FIG. 5B also shows other components. For example, the second flared flange (536) mentioned can be seen extending radially outwardly from the proximal cap extension (530), opposite the first flared flange (534).

Additionally, FIG. 5B shows that a opposed reinforcement flange (538) is attached to the first side wall (508), opposite the reinforcing flange (511). Like the reinforcing flange (511), the opposed reinforcement flange (538) extends radially outwardly from the first side wall (508) to about a radius of the distal end cap (504). As described above, the opposed reinforcement flange (538) and the reinforcing flange (511) together help the roller cover apply an even pressure to a workpiece during use, but also help ease the removal of the roller cover when the roller cover is to be changed.

Figure 5C:
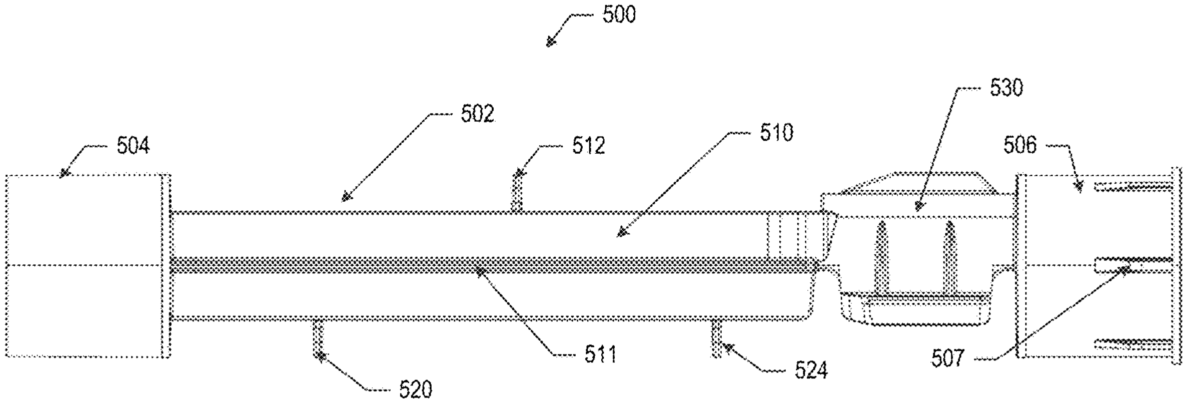

Attention is turned to FIG. 5C, which shows a side view of the roller cage (500). The roller cage body (502), distal end cap (504), proximal end cap (506), second side wall (510), reinforcing flange (511), mid-crest (512), distal crest (520), and proximal crest (524) are shown for reference. FIG. 5C, however, shows the profile of the roller cage (500). Thus, the mid-crest (512), distal crest (520), and proximal crest (524) are more prominently visible. As can be seen, the radial extent (i.e. length starting from the central longitudinal axis of the roller cage (500)) of the crests are at or somewhat past the radius of the distal end cap (504). In this manner, a tension fit may be established between the inner tube of the roller cover and the roller cage body (502); however, the roller cover remains easy to slip off when it is desired to change the roller cover.

Figure 5D:
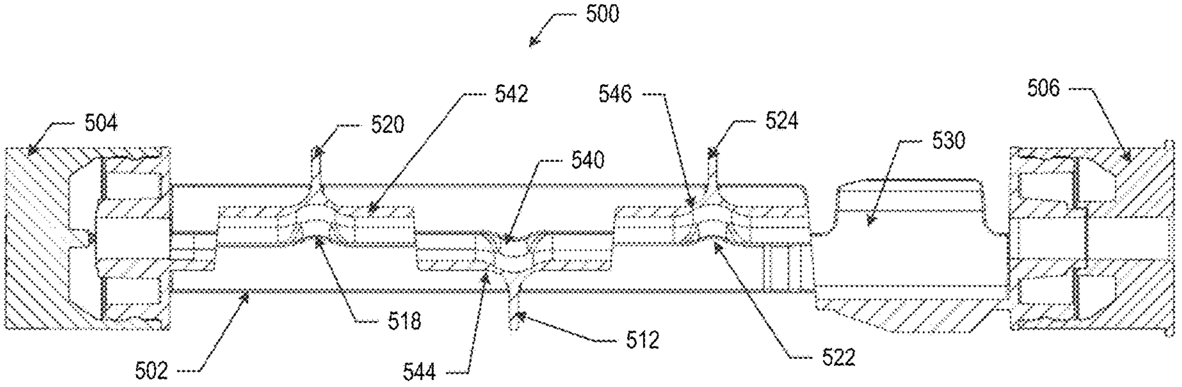

Attention is turned to FIG. 5D, which shows a cross-section of the side view of the roller cage (500) shown in FIG. 5C, but oriented one hundred degrees about the longitudinal axis relative to the perspective of the roller cage (500) shown in FIG. 5C. Thus, for example, the mid-crest (512), the distal crest (520), and the proximal crest (524) are now shown in the opposite orientation shown in FIG. 5C. The roller cage body (502), distal end cap (504), proximal end cap (506), distal dimple (518), proximal dimple (522), and proximal cap extension (530) are also shown for reference.

FIG. 5D also shows a mid-dimple (540) disposed opposite the mid-crest (512). The mid-dimple (540) is similar in structure to the distal dimple (518) and the proximal dimple (522). FIG. 5D also shows that the structures between the first side wall (508) and the second side wall (510) that are described above in FIG. 5A.

As can be seen, with reference to both FIG. 5A and FIG. 5D together, the roller cage body (502) may be characterized as a first side wall (508), a second side wall (510), and three sub-structures connected to the first side wall (508) and the second side wall (510). The three sub-structures are a distal sub-structure (542), a mid-sub-structure (544), and a proximal sub-structure (546). The distal sub-structure (542) includes the distal hemisphere (526), the distal dimple (518), and distal crest (520). The mid sub-structure (544) includes the mid-distal hemisphere (514), the mid-crest (512), and the mid-proximal hemisphere (516). The proximal sub-structure (546) includes the proximal dimple (522), the proximal crest (524), and the proximal hemisphere (528).

Thus, the roller cage body (502) may be characterized as three sub-sections, each having a corresponding crest. The crests alternate in opposed radial relationship to each other, as shown in FIG. 5D (e.g., the distal crest (520) and the mid-crest (512) are in opposed radial relationship, and the mid-crest (512) and the proximal crest (524) are also in opposed radial relationship to each other).

An additional hemisphere may be disposed proximally of the distal crest (520), opposite the distal hemisphere (526) in the distal sub-structure (542). Similarly, another additional hemisphere may be disposed distally of the proximal crest (524), opposite the proximal hemisphere (528). Again, together, the hemispheres receive the frame (104) of a paint roller (100) (see FIG. 1) in order to retain the roller cage body (502) on the frame (104).

FIG. 6A through FIG. 6J show variations of a paint roller handle, in accordance with one or more embodiments. The handle (600) shown in FIG. 6A through FIG. 6J may be the handle (102) shown in FIG. 1A, 1C, or FIG. 2A. The handle (600) may have an curved shapes. Stippling (602) may be disposed on the outer surface of the handle (600). Decorative imagery, such as maple leaf (604) or identifier (606) may be disposed at various locations on the handle (600). The handle shape shown in FIG. 6A may be ascetic, as shown. The receiver (608) disposed at one end of the handle (600) may be shaped, sized, dimensioned, and be threaded in order to rapidly change frames that may extend from the receiver (608).

Figure 6A:
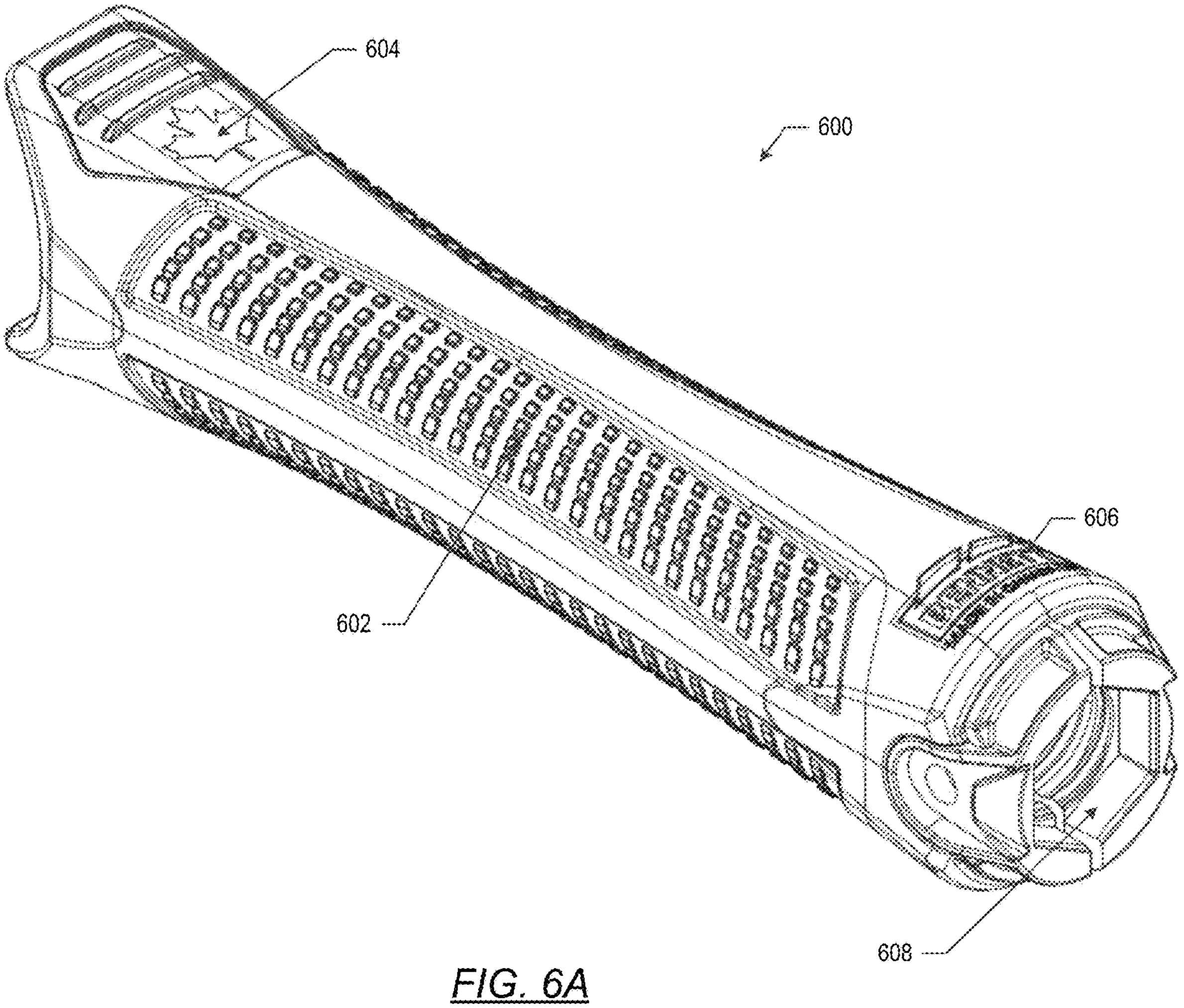
FIG. 6A, FIG. 6B, FIG. 6C, FIG. 6D, FIG. 6E, FIG. 6F, FIG. 6G, FIG. 6H.
Figure 6B:
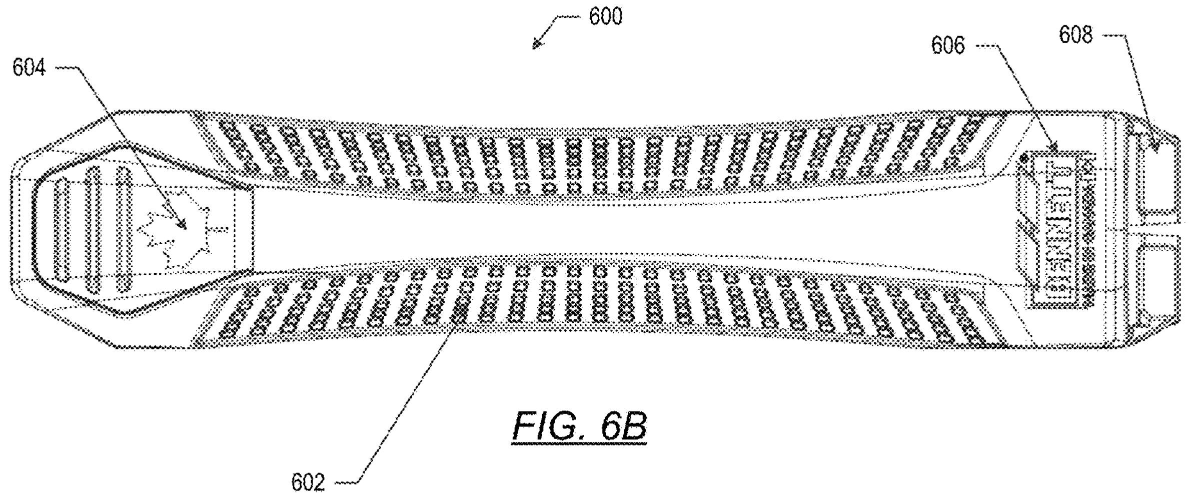

FIG. 6B shows another view of the handle (600) shown in FIG. 6A. The stippling (602), maple leaf (604), identifier (606), and receiver (608) are shown for reference.

Figure 6C:
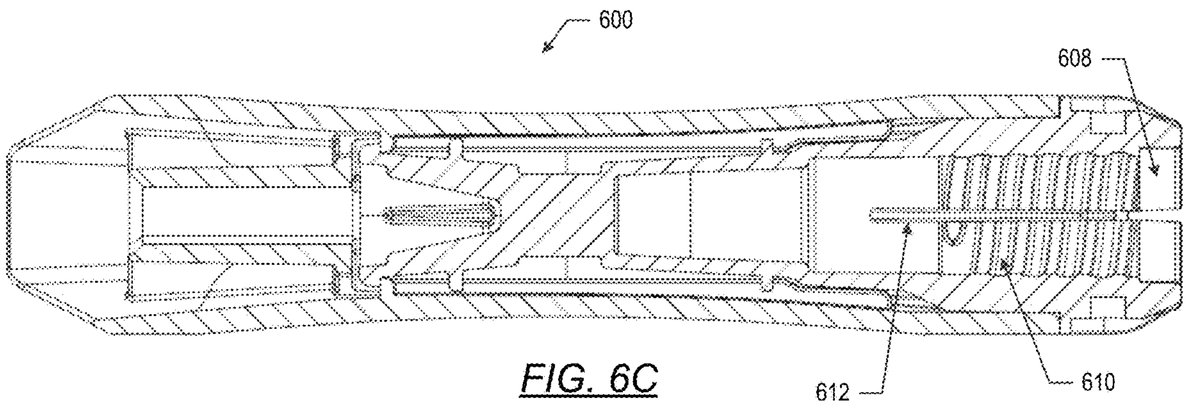
Figure 6D:
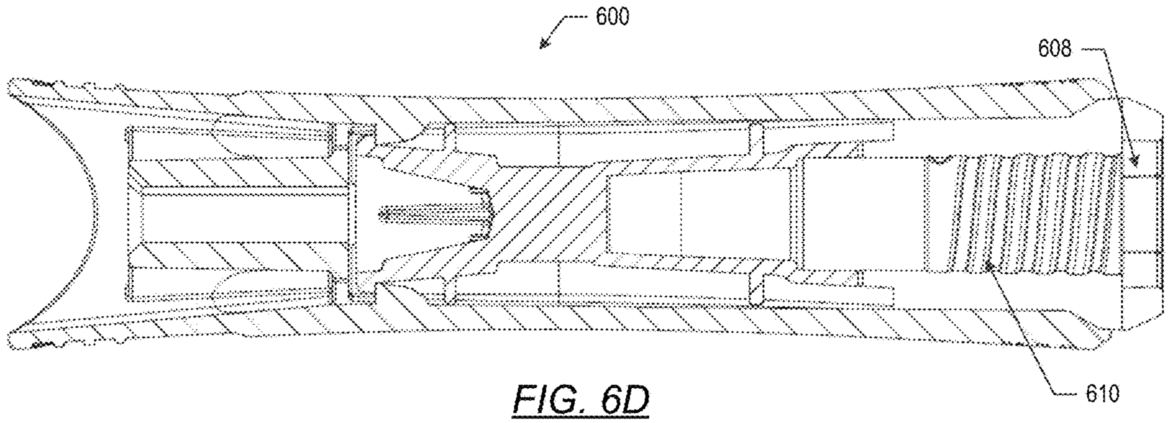

FIG. 6C and FIG. 6D shows two different cross-sections of the handle (600) shown in FIG. 6A or FIG. 6B. In FIG. 6C and FIG. 6D, the threading (610) of the receiver (608) may be seen, one from a cut-through perspective of the receiver (608) (FIG. 6C), and another from an outside of the receiver (608) but still inside the handle (600) (FIG. 6D). A slot (612) shown in FIG. 6C may be disposed in an edge of the receiver (608) in order to accommodate corresponding features in a frame receive in order to lock the frame in place during use.

Figure 6E:
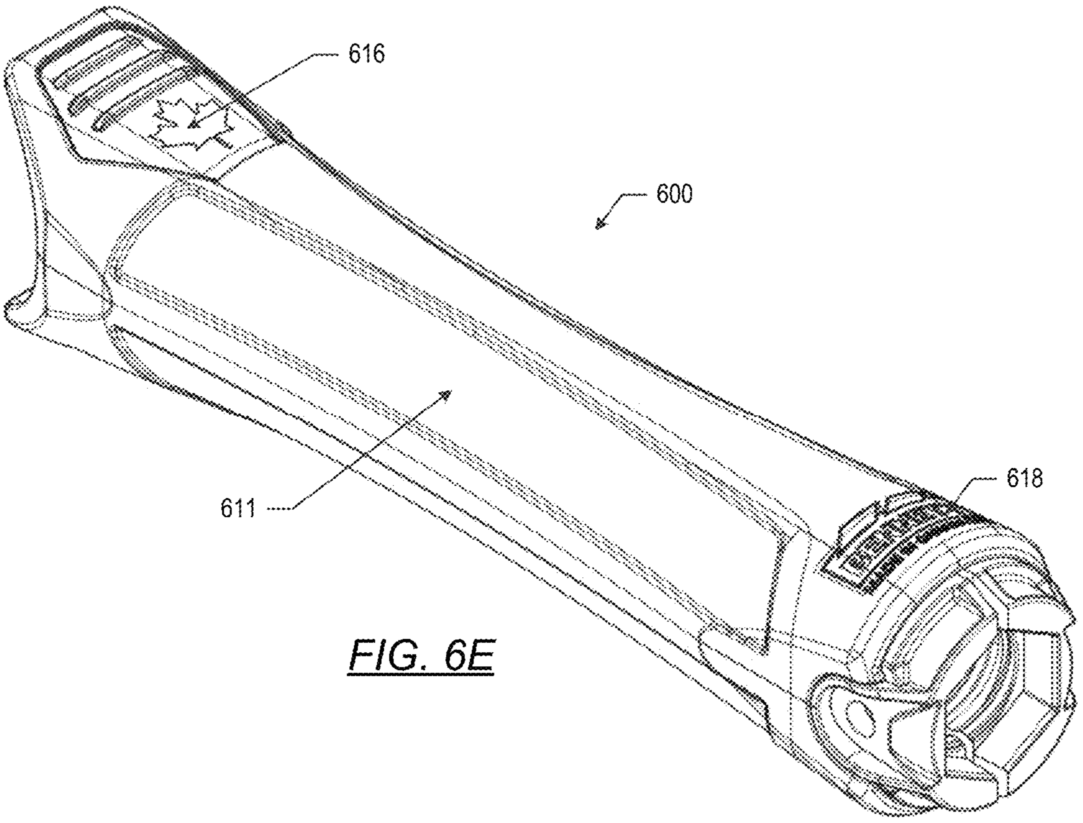

FIG. 6E shows a similar handle (600) relative to FIG. 6A. However, the stippling (602) is either not present, or is diminished in prominence. In other words, rather than having prominent stippling, as shown in FIG. 6A, the handle (600) may be provided with smooth sections or sections that are filled with stippling that has the consistency of sandpaper (of a pre-determined grit). An example of the smooth section (611) is shown in FIG. 6E, FIG. 6H, and FIG. 6I. An example of a stippling with reduced prominence (e.g. like sandpaper) is shown in section (614) of FIG. 6J.

Figure 6F:
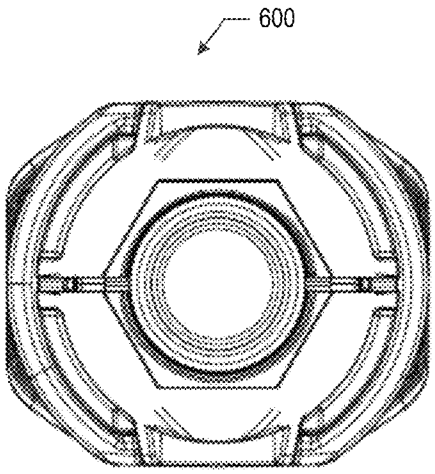
Figure 6G:
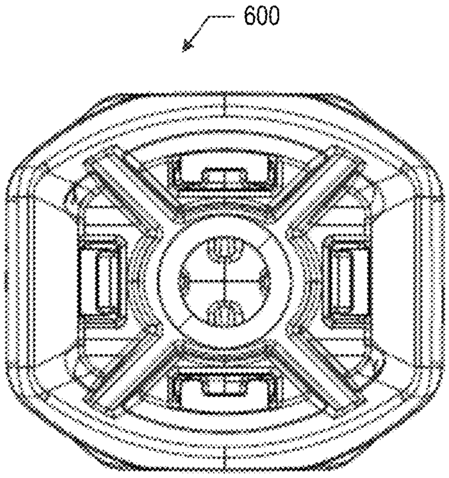
Figure 6H:
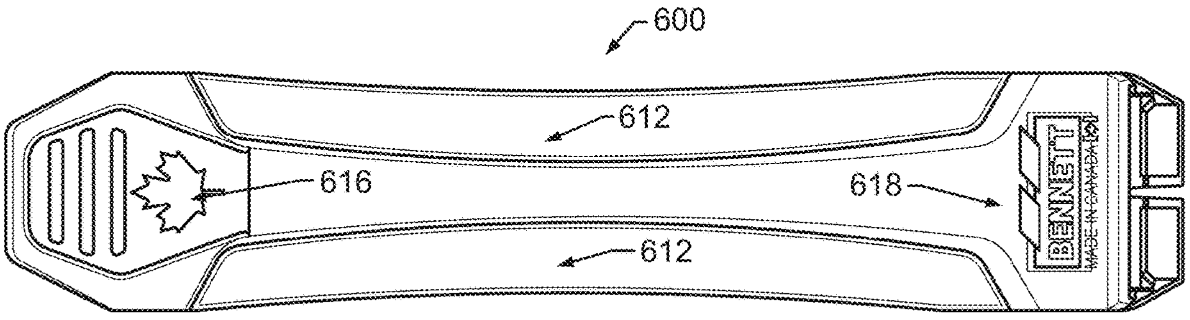
Figure 6I:
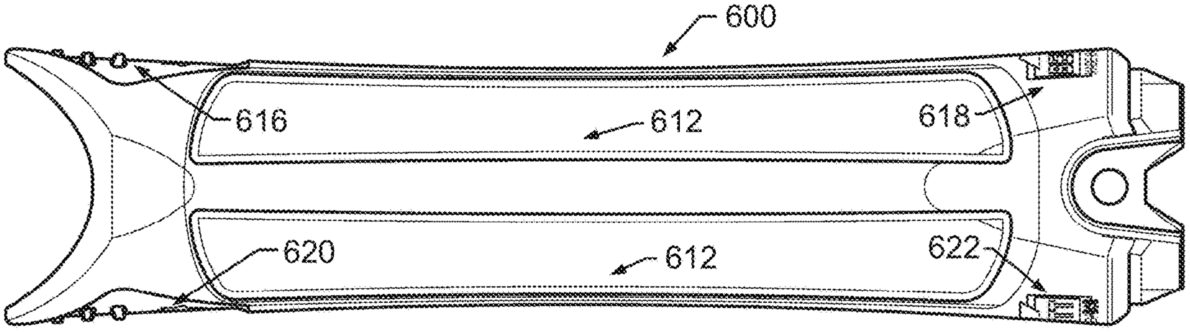
FIG. 6I, and FIG. 6J show variations of a paint roller handle, in accordance with one or more embodiments.
Figure 6J:
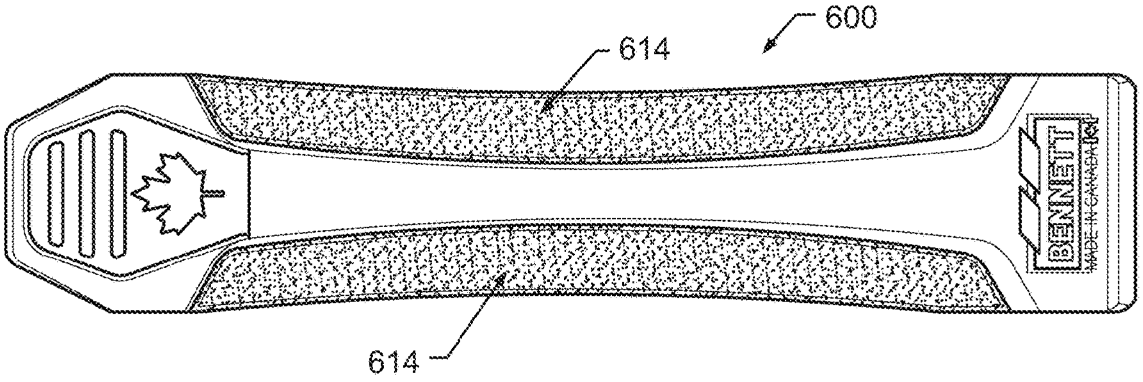

FIG. 6F, FIG. 6G, FIG. 6H, and FIG. 6I show alternative views of the handle (600) shown in FIG. 6E. FIG. 6F shows a front view of the handle (600) (e.g., the end into which a roller cage and/or handle might be inserted). FIG. 6G shows the opposing end of the handle (600) (e.g., the bottom end of the handle (600)). FIG. 6H shows a top side of the handle (600). FIG. 6I shows the handle (600) rotated ninety degrees relative to the top side view of the handle (600) shown in FIG. 6H. Decorative markings (e.g., marking (616), marking (618), marking (620), and marking (622)) may indicate the make and/or model of the handle (600).

While FIG. 1A through FIG. 6J show a configuration of components, other configurations may be used without departing from the scope of the one or more embodiments. For example, various components may be combined to create a single component. As another example, the functionality performed by a single component may be performed by two or more components.

Figure 7:
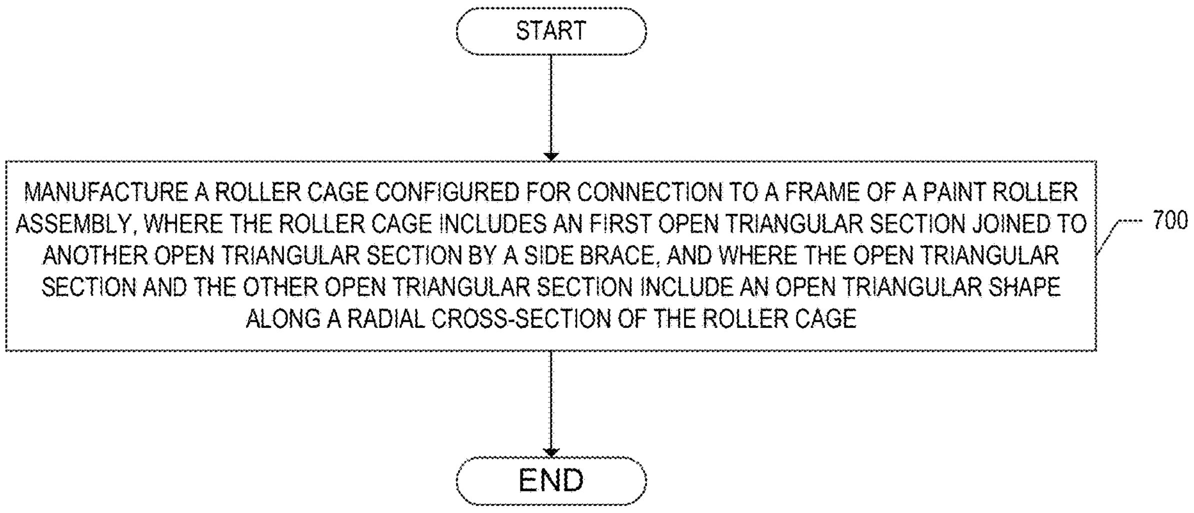
FIG. 7 shows a method for manufacturing a roller cage, in accordance with one or more embodiments.

FIG. 7 is a flowchart of a method for manufacturing a paint roller, in accordance with one or more embodiments. The method of FIG. 7 may be performed using any of the devices shown in FIG. 1A through FIG. 5D.

Step 700 may include manufacturing a roller cage configured for connection to a frame of a paint roller assembly, where the roller cage includes an open triangular section joined to another open triangular section by a side brace, and where the open triangular section and the other open triangular section include an open triangular shape along a radial cross-section of the roller cage. In one embodiment, the method of FIG. 7 may terminate thereafter.

The method of FIG. 7 may be varied. For example, the open triangular sections may be replaced by the sub-sections shown in FIG. 5A through FIG. 5D. In the case where some of the components or sub-components are not formed as an integral whole, different steps may be added to the method to attach the components during a manufacturing process.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A device comprising:

a roller cage configured for connection to a frame of a paint roller assembly, wherein the roller cage comprises:
 a first open triangular section joined to a second open triangular section by a side brace,
 wherein the first open triangular section and the second open triangular section comprises an open triangular shape along a radial cross-section of the roller cage,
 wherein the first open triangular section is inverted relative to the second open triangular section,
 the first open triangular section comprises a first apex and a first base, and the second open triangular section comprises a second apex and a second base,
 the first apex extends past the second base along the radial cross-section of the roller cage, and
 the second apex extends past the first base along the radial cross-section of the roller cage.

2. The device of claim 1, wherein the first open triangular section comprises a first flared flange and the second open triangular section has a second flared flange.

3. The device of claim 1, wherein the first open triangular section comprises a first apex flange and the second open triangular section comprises a second apex flange.

4. The device of claim 1, wherein:

the first open triangular section has a first apex flange and the second open triangular section comprises a second apex flange, the first apex flange comprises a first shape, and the second apex flange comprises a second shape different than the first shape.

5. The device of claim 1, wherein:

the first open triangular section comprises a first apex flange and the second open triangular section has a second apex flange, the first apex flange is sloped along a longitudinal cross-section of the roller cage, and the second apex flange has a flat cross-section along the longitudinal cross-section.

6. The device of claim 1, wherein:

the first open triangular section comprises a first apex flange and the second open triangular section comprises a second apex flange, the first apex flange comprises an irregular shape along a longitudinal cross-section of the roller cage, and the second apex flange comprises a first sloped section, a flat section, and a second sloped section along the longitudinal cross-section.

7. The device of claim 1, wherein:

the first open triangular section comprises a flared flange, and the flared flange comprises a first sloped section, a flat section, and second sloped section along a longitudinal cross-section of the roller cage.

8. The device of claim 1, wherein:

the first open triangular section comprises a first apex flange having an irregular shape along a longitudinal cross-section of the roller cage, the first open triangular section comprises a flared flange, and the flared flange comprises a first sloped section, a flat section, and second sloped section along the longitudinal cross-section of the roller cage.

9. The device of claim 1, wherein:

the first open triangular section comprises a first apex flange having a flat shape along a longitudinal cross-section of the roller cage, the first open triangular section comprises a flared flange, and the flared flange comprises a plurality of handles.

10. A method comprising:

manufacturing a roller cage configured for connection to a frame of a paint roller assembly, wherein the roller cage comprises:

a first open triangular section joined to a second open triangular section by a side brace, wherein the first open triangular section and the second open triangular section comprises an open triangular shape along a radial cross-section of the roller cage, wherein the first open triangular section is inverted relative to the second open triangular section, the first open triangular section comprises a first apex and a first base, and the second open triangular section comprises a second apex and a second base, the first apex extends past the second base along the radial cross-section of the roller cage, and the second apex extends past the first base along the radial cross-section of the roller cage.

* * * * *